United States Patent  (10) Patent No.: US 10,263,834 B2
Inohiza  (45) Date of Patent: Apr. 16, 2019

(54) COMMUNICATION APPARATUS, CONTROL METHOD, AND STORAGE MEDIUM FOR TRANSMITTING DATA IN DIFFERENT ANTENNA DIRECTIONS

(71) Applicant: CANON KABUSHIKI KAISHA, Tokyo (JP)

(72) Inventor: Hirohiko Inohiza, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 49 days.

(21) Appl. No.: 15/348,022

(22) Filed: Nov. 10, 2016

(65) Prior Publication Data

US 2017/0141952 A1    May 18, 2017

(30) Foreign Application Priority Data

Nov. 17, 2015 (JP) .................. 2015-225084

(51) Int. Cl.
*H04L 12/28* (2006.01)
*H04L 12/24* (2006.01)
*H04L 5/00* (2006.01)
*H04W 72/04* (2009.01)

(52) U.S. Cl.
CPC ........ *H04L 41/0668* (2013.01); *H04L 5/0055* (2013.01); *H04W 72/046* (2013.01); *H04W 72/0446* (2013.01)

(58) Field of Classification Search
CPC . H04L 41/0668; H04L 5/0055; H04L 1/1893; H04L 1/08; H04W 72/0446; H04W 72/046; H04W 74/006
See application file for complete search history.

(56) References Cited

U.S. PATENT DOCUMENTS

| 8,811,320 | B2 | 8/2014 | Inohiza | |
| 2008/0218413 | A1* | 9/2008 | Li | H04B 7/04 342/367 |
| 2010/0122135 | A1* | 5/2010 | Lida | H04L 1/007 714/748 |
| 2010/0284476 | A1* | 11/2010 | Potkonjak | H04L 1/1858 375/260 |
| 2012/0025957 | A1* | 2/2012 | Yang | H05B 37/0272 340/12.5 |
| 2015/0030011 | A1* | 1/2015 | Liu | H04L 1/1893 370/336 |
| 2016/0183158 | A1* | 6/2016 | Decarreau | H04W 36/02 370/328 |

FOREIGN PATENT DOCUMENTS

WO    2012/131924 A1    10/2012

* cited by examiner

*Primary Examiner* — Abdelnabi O Musa
(74) *Attorney, Agent, or Firm* — Carter, DeLuca & Farrell LLP

(57) ABSTRACT

A communication apparatus sets a first antenna direction to be used in a first time slot among a plurality of time slots, and a second antenna direction to be used in a second time slot among the plurality of time slots, transmits first data in the first time slot by using a first communication path using the first antenna direction, retransmits the first data in the second time slot by using a second communication path using the second antenna direction if transmission of the first data has failed, and transmits second data different in type from the first data in the second time slot by using the second communication path using the second antenna direction if transmission of the first data has succeeded.

12 Claims, 17 Drawing Sheets

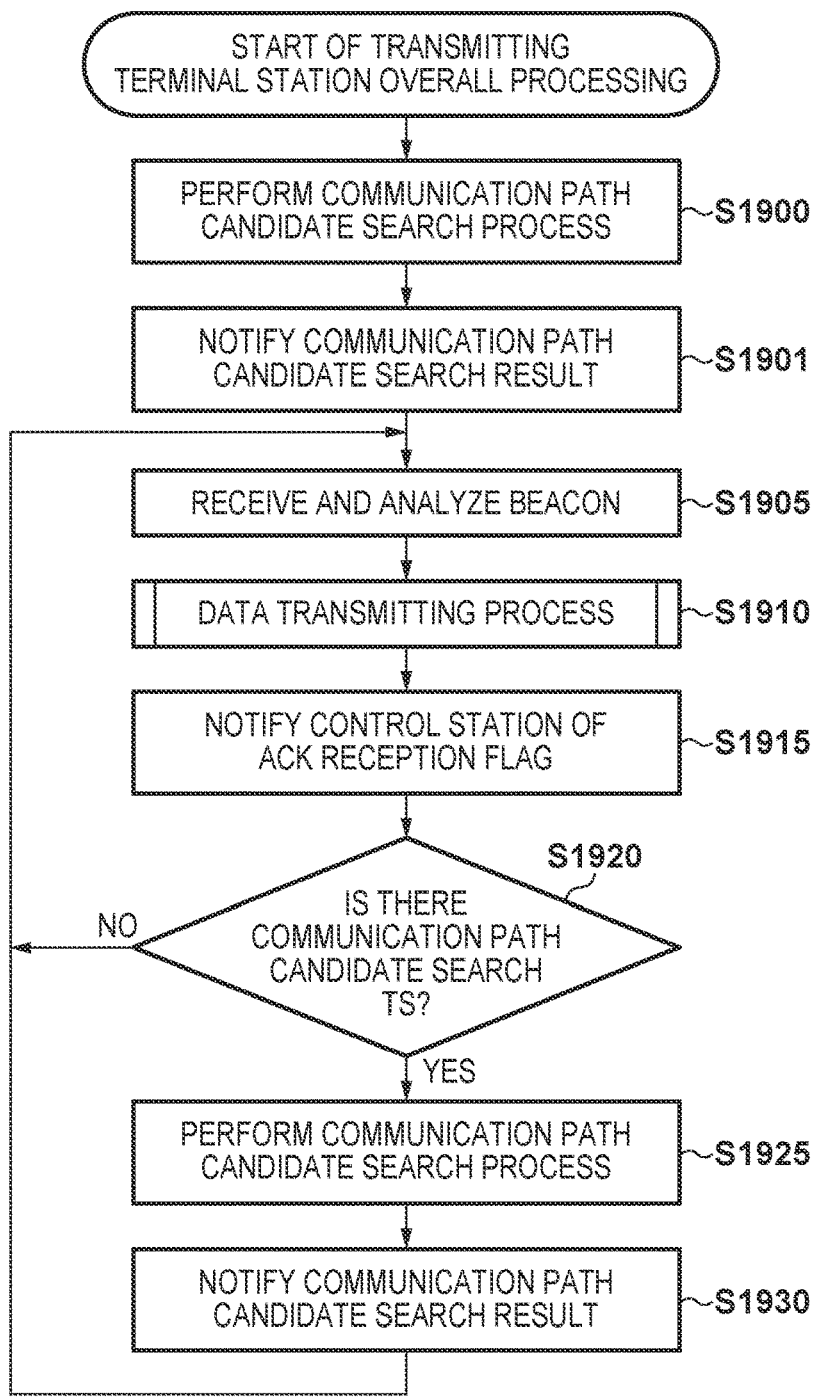

COMMUNICATION APPARATUS, CONTROL METHOD, AND STORAGE MEDIUM FOR TRANSMITTING DATA IN DIFFERENT ANTENNA DIRECTIONS

BACKGROUND OF THE INVENTION

Field of the Invention

The present invention relates to a wireless communication technique of transmitting data in a plurality of different antenna directions.

Description of the Related Art

A technique of performing wireless communication in frequency bands such as a millimeter wave band/submillimeter wave band is being extensively examined. Since a wide bandwidth can be secured in a frequency band like this, high-speed wireless transmission is possible. Generally, as the frequency increases, high-speed communication becomes possible by securing a wide bandwidth, but the frequency gradually gains a property close to that of light, so the straightness increases. That is, when using a frequency band such as a millimeter wave band, if an obstacle exists in the propagation direction of a radio wave, the communication quality of a communication path pertaining to the propagation direction significantly deteriorates.

On the other hand, International Publication No. 2012/131924 describes a technique of transmitting data from a transmitting station to a receiving station by using a predetermined communication path, and, if the transmitting station cannot receive any acknowledgement from the receiving station, retransmitting the same data by using another communication path.

In this technique described in International Publication No. 2012/131924, if no error occurs in a communication path used in normal operation, other communication paths are not used. Therefore, the states of the other communication paths cannot be known unless an error occurs. In wireless communication, the state of a communication channel often changes. Accordingly, even when a plurality of communication paths having a high communication quality are prepared in advance, while no problem arises in communication quality of one communication path in use, the state of another communication path sometimes changes such that no satisfactory communication quality can be obtained. In this case, if a communication error occurs in the communication path in use and the communication path is switched to another communication path, an error may occur in this communication path as the switching destination.

The present invention provides a communication method capable of monitoring the states of a plurality of set communication paths during communication.

SUMMARY OF THE INVENTION

According to one aspect of the present invention, there is provided a communication apparatus comprising: a setting unit configured to set a first antenna direction to be used in a first time slot among a plurality of time slots, and a second antenna direction to be used in a second time slot among the plurality of time slots; a first transmitting unit configured to transmit first data in the first time slot by using a first communication path using the first antenna direction; and a second transmitting unit configured to retransmit the first data in the second time slot by using a second communication path using the second antenna direction if transmission of the first data by the first transmitting unit has failed, and transmit second data different in type from the first data in the second time slot by using the second communication path using the second antenna direction if transmission of the first data by the first transmitting unit has succeeded.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 19 is a flowchart of a data transmitting process of the terminal station.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

In this embodiment, an example of a case in which an MR (Mixed Reality) system is used as an application to which a wireless communication system is applied will be explained. The MR system includes an HMD (Head Mounted Display) to be mounted on the head of a user, and a PC (Personal Computer) which performs video processing. Between the HMD and the PC, real-time video data and non-real-time control data are bidirectionally communicated. In this MR system, the communication state between the HMD and the PC momentarily changes because the HMD moves. In this embodiment, therefore, the states of a plurality of communication paths are monitored during communication by a method to be explained below, so as to be able to maintain a plurality of communication paths capable of ensuring satisfactory communication quality even when the communication state changes with time. Note that the MR system is merely an example of an application to which the wireless communication system according to this embodiment is applied, and the wireless communication system according to this embodiment is not limited to the MR system. That is, the following argument is applicable to an arbitrary system which sets a plurality of communication paths (antenna directions), and performs communication by using at least one of the plurality of set communication paths.

(Configuration of MR System)

Figure 1:
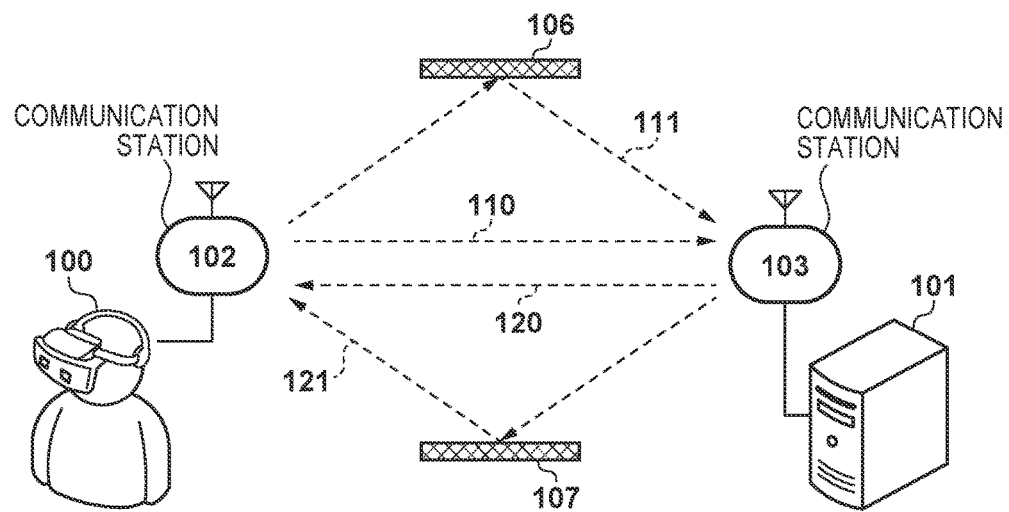
FIG. 1 is a view showing a configuration example of a system to which a wireless communication system according to an embodiment is applied.

FIG. 1 shows a configuration example of the MR system according to this embodiment. As an example, the MR system of this embodiment includes a head mounted display (HMD) 100 (for example, a video see-through type display) to be mounted on a user, and a personal computer (PC) 101 which functions as a video processor. The HMD 100 and PC 101 respectively include communication stations 102 and 103 capable of performing wireless communication with each other as communication partner apparatuses. Each communication station has a directional antenna, and can transmit and receive wireless signals by setting various communication paths by switching antenna directions. Assume that it is possible to use direct-wave communication paths 110 and 120 and reflected-wave communication paths 111 and 121 between the communication station 102 of the HMD 100 and the communication station 103 of the PC 101. The direct-wave communication paths 110 and 120 are communication paths settable when there is no obstacle between the communication stations 102 and 103 and line-of-sight is secured. On the other hand, the reflected-wave communication paths 111 and 121 are communication paths containing the reflection of a radio wave by an object during the propagation of the radio wave between the communication stations 102 and 103. Also, the communication paths 110 and 111 indicate communication paths to be used in signal transmission from the communication station 102 to the communication station 103, and the communication paths 120 and 121 indicate communication paths to be used in signal transmission from the communication station 103 to the communication station 102. Note that the communication paths 111 and 121 are depicted as different communication paths in FIG. 1, but they can also be communication paths passing through the same channel. Note also that FIG. 1 shows the two communication paths from the communication station 102 to the communication station 103, and the two communication paths from the communication station 103 to the communication station 102, but three or more communication paths may also be used.

The HMD 100 transmits video data captured by a camera to the PC 101 by using the communication path 110 or 111. The PC 101 analyzes the received video data, and discriminates the position and posture of the HMD 100. Then, the PC 101 generates CG (Computer Graphics), and combines the CG with the video data. After that, the PC 101 transmits the CG-combined video data to the HMD 100 by using the communication path 120 or 121. The HMD 100 displays the received CG-combined video data on a liquid-crystal panel. To display images having no sense of incongruity to the user, a delay time permitted for video data communication is about a few milliseconds to a few tens of milliseconds, that is, a high real-time performance is required.

In addition to the video data, control data is also communicated between the HMD 100 and the PC 101. However, a delay time permitted for control data communication is about a few seconds, that is, no high real-time performance is required. Control data to be notified from the HMD 100 to the PC 101 can contain, for example, periodically generated information such as the residual battery amount and radio wave status, or information which is generated when an event occurs, such as the switching state of the HMD or the log.

In the MR system of this embodiment as described above, real-time data such as video data and non-real-time data such as control data exist, and both the data are communicated. Note that the real-time data is preferential data to be preferentially transmitted, and the non-real-time data is non-preferential data having a relatively low priority. These are examples of a plurality of types of data (for example, first data and second data) to be transmitted between communication apparatuses. In the following description, an example in which video data as the real-time data is transmitted in accordance with UDP and control data as the non-real-time data is transmitted in accordance with TCP will be explained. Note that when preferential data and non-preferential data are classified based on another priority order, the following argument can be applied by regarding real-time data as preferential data, and non-real-time data as non-preferential data.

The communication stations 102 and 103 perform data communication by using a time slot (to be called "TS" hereinafter) which is time-divisionally allocated. As an example, one of the communication stations 102 and 103 operates as a control station, and the other communication station operates as a terminal station. The control station generates a beacon containing TS allocation information which contains information of the data exchange timing and the antenna direction for each TS, notifies the terminal station of the beacon, and performs wireless access control on the terminal station in the network. In this embodiment, the communication station 102 on the HMD side operates as the control station, and the communication station 103 on the PC side operates as the terminal station.

(Antenna Characteristics)

Figures 2A, 2B:
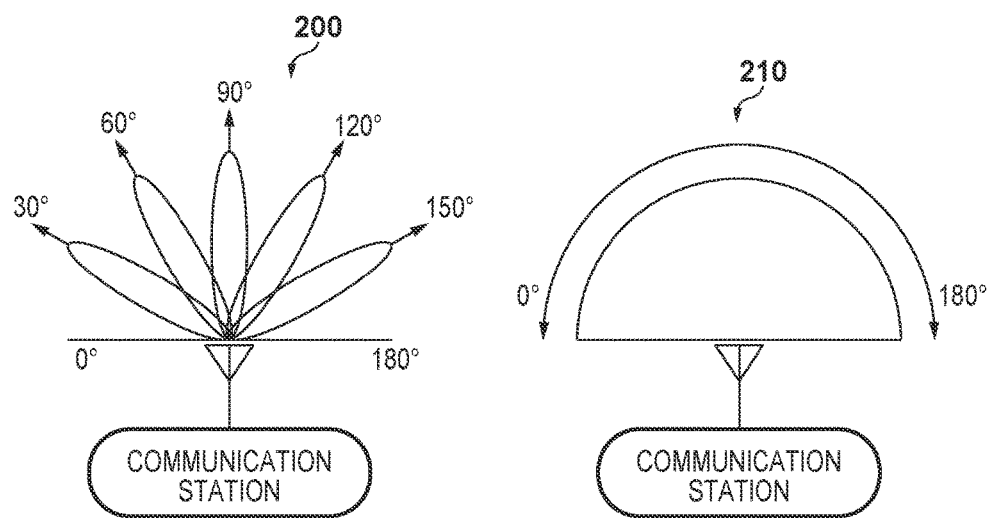
FIGS. 2A and 2B are conceptual views showing antenna characteristics settable by a communication station.

FIGS. 2A and 2B show antenna direction characteristics settable by the communication stations 102 and 103. Each of the communication stations 102 and 103 has a directional antenna including a plurality of antenna elements, and can perform communication by switching a narrow-directivity mode 200 shown in FIG. 2A and a wide-directivity mode 210 shown in FIG. 2B by controlling the phase and amplitude of a wireless signal to be transmitted and received by each antenna element.

In the narrow-directivity mode 200 of this embodiment, it is possible to control a range of 30° to 150° by 30°-step resolution, and form beams having five direction patterns.

However, the direction range and resolution in the narrow-directivity mode 200 are not limited to them, and it is also possible to set directions within a broader or narrower range with a finer or coarser resolution. Also, the wide-directivity mode 210 of this embodiment covers directions in a broad range of 0° to 180°, but the range is not limited to this. That is, the wide-directivity mode 210 may also cover a broader or narrower range.

In the narrow-directivity mode 200, the gain in a direction other than the antenna directions is lower than that in the wide-directivity mode 210, but a high gain can be obtained in the antenna direction (and its periphery), so high-speed high-quality data transmission can be performed. In the wide-directivity mode 210, the communication rate may decrease because no gain can be obtained by setting the antenna direction, but the gain in a direction other than the antenna directions is higher than that in the narrow-directivity mode 200, so signals can be exchanged through various communication paths. In this embodiment, the narrow-directivity mode 200 is used in communication of video data and control data between predetermined communication stations, and the wide-directivity mode 210 is used in transmission of access control information such as a beacon generated by the control station, so that a larger number of terminal stations can receive the information.

(Configuration of Communication Station)

Figure 3:
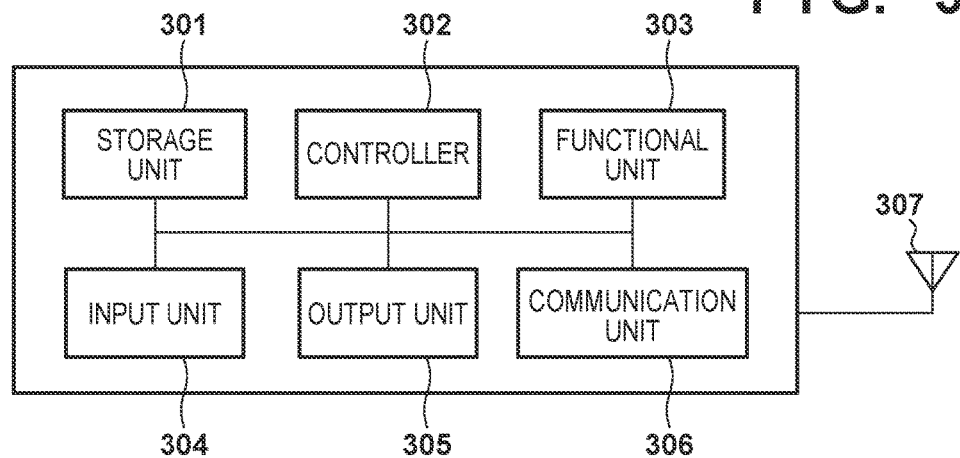
FIG. 3 is a view showing a hardware configuration example of an HMD and PC.

FIG. 3 shows the hardware configuration of the HMD 100 and PC 101.

A storage unit 301 is a memory such as a ROM or RAM, and stores programs for performing various operations to be described later, and various kinds of information such as communication parameters for wireless communication. Note that as the storage unit 301, it is also possible to use a storage medium such as a flexible disk, hard disk, optical disk, magnetooptical disk, CD-ROM, CD-R, magnetic tape, nonvolatile memory card, or DVD, instead of the memory such as a ROM or RAM. The storage unit 301 may also include a plurality of memories.

A controller 302 is a processor such as a CPU or MPU, and controls the whole HMD 100 and PC 101 by executing the programs stored in the storage unit 301. Note that the controller 302 may also control the whole HMD 100 and PC 101 in cooperation with the programs and an OS (Operating System) stored in the storage unit 301. Note also that the controller 302 may include a plurality of processors such as multicores, and control the whole HMD 100 and PC 101 by the plurality of processors. Processes to be shown in flowcharts of FIGS. 12 to 19 (to be presented later) are implemented by, for example, executing the programs stored in the storage unit 301 of the HMD 100 or PC 101 by the processor of the controller 302.

In addition, the controller 302 executes predetermined processes such as image capturing, printing, and image projection by controlling a functional unit 303. The functional unit 303 is hardware which allows the HMD 100 and PC 101 to execute the predetermined processes. For example, the functional unit 303 of the HMD 100 includes an image capturing unit for performing an image capturing process. Also, the functional unit 303 of the PC 101 executes, for example, determination of the position/posture of the HMD 100 based on an image acquired from the HMD 100, and image processing including generation of a CG image corresponding to the determination result and combining of the CG image to the image acquired from the HMD 100. Note that the HMD 100 and PC 101 can have other functions, and the functional unit 303 can implement some or all of these functions. Data to be processed by the functional unit 303 can be data stored in the storage unit 301, and can also be data obtained by communication performed with another communication apparatus via a communication unit 306 (to be described later).

An input unit 304 accepts various operations from the user. An output unit 305 performs various outputs to the user. The outputs by the output unit 305 herein mentioned include at least one of image display on the screen, sound output by a loudspeaker, vibration output, and the like. For example, the output unit 305 of the HMD 100 displays an image combined with CG received from the PC 101. It is also possible to, for example, implement the input unit 304 and output unit 305 of the PC 101 by one module such as a touch panel.

The communication unit 306 corresponds to the above-described communication stations 102 and 103, and performs control of wireless communication complying with, for example, the IEEE802.11 series, and control of IP communication. In this embodiment, the communication unit 306 performs wireless communication using millimeter wave/submillimeter wave frequency bands. As communication protocols, UDP is used to exchange video data, and TCP is used to exchange control data. The communication unit 306 transmits and receives wireless signals for wireless communication by controlling an antenna 307. The HMD 100 and PC 101 communicate contents such as image data, document data, and video data with another communication station 102 via the communication unit 306. The HMD 100 and PC 101 can function as communication apparatuses by the functions of the communication unit 306.

Figure 4:
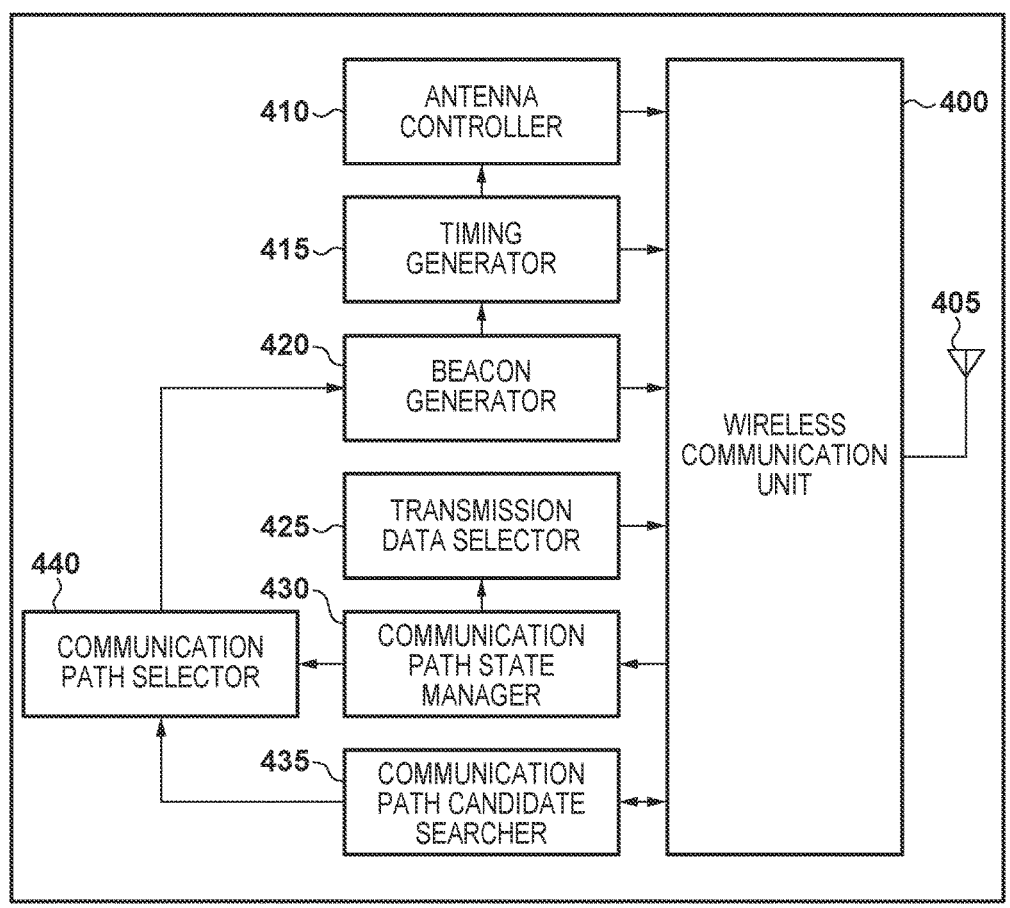
FIG. 4 is a block diagram showing a functional configuration example of a communication station which operates as a control station.

The functional configuration of the communication stations 102 and 103 will be explained in detail below. FIG. 4 is a block diagram showing the internal arrangement of the communication station 102 of the HMD 100 which operates as a control station. For example, the communication station 102 includes a wireless communication unit 400, an antenna unit 405, an antenna controller 410, a timing generator 415, a beacon generator 420, a transmission data selector 425, a communication path state manager 430, a communication path candidate searcher 435, and a communication path selector 440.

The wireless communication unit 400 performs signal processing for transmission/reception including modulation/demodulation with respect to wireless data. The antenna unit 405 radiates and absorbs electromagnetic waves by using a set antenna direction, when the wireless communication unit 400 transmits and receives wireless signals. The antenna controller 410 sets and controls the antenna direction in transmission/reception by the antenna unit 405. The timing generator 415 notifies the antenna controller 410 and wireless communication unit 400 of the timing of the transmitting/receiving process.

The beacon generator 420 generates a beacon containing TS allocation information in a communication frame. All terminal stations participating in the network are notified of the beacon via the wireless communication unit 400. The TS allocation information contains, for example, the type of each TS in the communication frame, the transmission/reception timing, and information of the antenna direction. The type of TS can contain a TS for data communication, a TS for communication path search, and the like. The timing generator 415 notifies the antenna controller 410 and wireless communication unit 400 of the same transmission/reception timing as that contained in the TS allocation information in the beacon. Details of the arrangement of the communication frame will be described later with reference to FIGS. 6 and 7.

The transmission data selector 425 selects data to be transmitted by each TS from video data and control data in accordance with the communication path state. That is, the transmission data selector 425 has a TS allocating function of allocating a TS to transmission data. The communication path state manager 430 determines the state of a communication path in use based on an acknowledgement notified from a terminal station. If a predetermined number of communication paths cannot be found, the communication path candidate searcher 435 transmits and receives training signals while switching antenna directions by using TS for communication path search, thereby searching for a new communication path candidate. The communication path selector 440 selects a communication path to be used in communication with a terminal station, based on the latest communication path candidate search result obtained by the communication path candidate searcher 435, and the communication path state obtained by the communication path state manager 430. The TS allocation information to be contained in the beacon is generated based on the communication path selected by the communication path selector 440.

Figure 5:
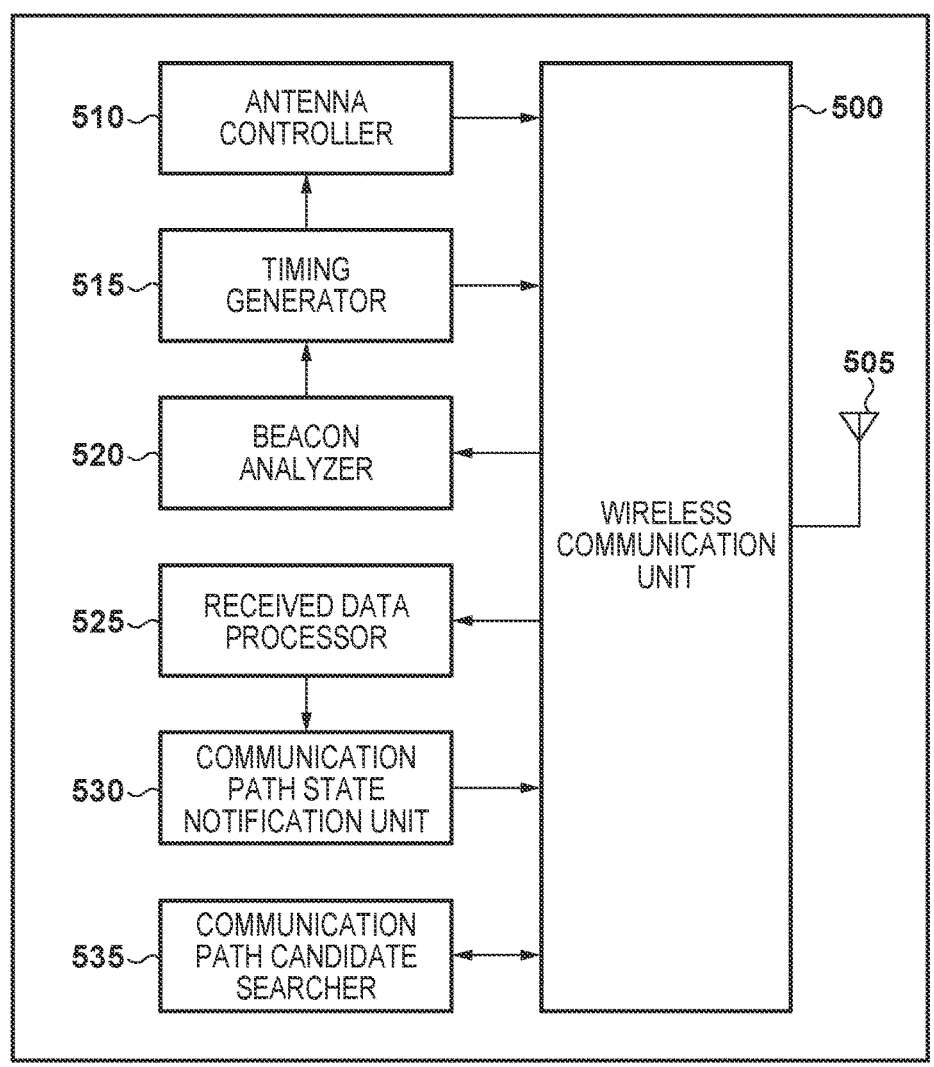
FIG. 5 is a block diagram showing a functional configuration example of a communication station which operates as a terminal station.

Next, a functional configuration example of the communication station 103 in the PC 101 which operates as a terminal station will be explained with reference to FIG. 5. For example, the communication station 103 includes a wireless communication unit 500, an antenna unit 505, an antenna controller 510, a timing generator 515, a beacon analyzer 520, a received data processor 525, a communication path state notification unit 530, and a communication path candidate searcher 535.

The wireless communication unit 500 performs signal processing for transmission/reception including modulation/demodulation with respect to wireless data. The antenna unit 505 radiates and absorbs electromagnetic waves by using a set antenna direction, when the wireless communication unit 500 transmits and receives wireless signals. The antenna controller 510 sets and controls the antenna direction in transmission/reception by the antenna unit 505. The timing generator 515 notifies the antenna controller 510 and wireless communication unit 500 of the timing of the transmitting/receiving process.

The beacon analyzer 520 analyzes TS allocation information of a beacon transmitted by the control station and received via the wireless communication unit 500. The TS allocation information contains, for example, the type of each TS in a communication frame, the transmission/reception timing, and information of the antenna direction. The transmission/reception timing to be generated by the timing generator 515 is determined based on the TS allocation information in the beacon. The received data processor 525 performs error detection on video data or control data received by a TS for data communication, and transfers data in which no error is detected to an application. The communication path state notification unit 530 notifies the control station of at least one of an affirmative acknowledgement (ACK) for a case in which no error is found as a result of error detection by the received data processor 525, and a negative acknowledgement (NAK) for a case in which an error is found. Note that the communication path state notification unit 530 may also notify the negative acknowledgement by transmitting no ACK instead of transmitting NAK, or notify the affirmative acknowledgement by transmitting no NAK instead of transmitting ACK. Based on an instruction from the control station, the communication path candidate searcher 535 transmits and receives training signals while switching antenna directions by using a TS for communication path search, thereby searching for a new communication path candidate.

(Configurations of Communication Frames)

Figure 6:
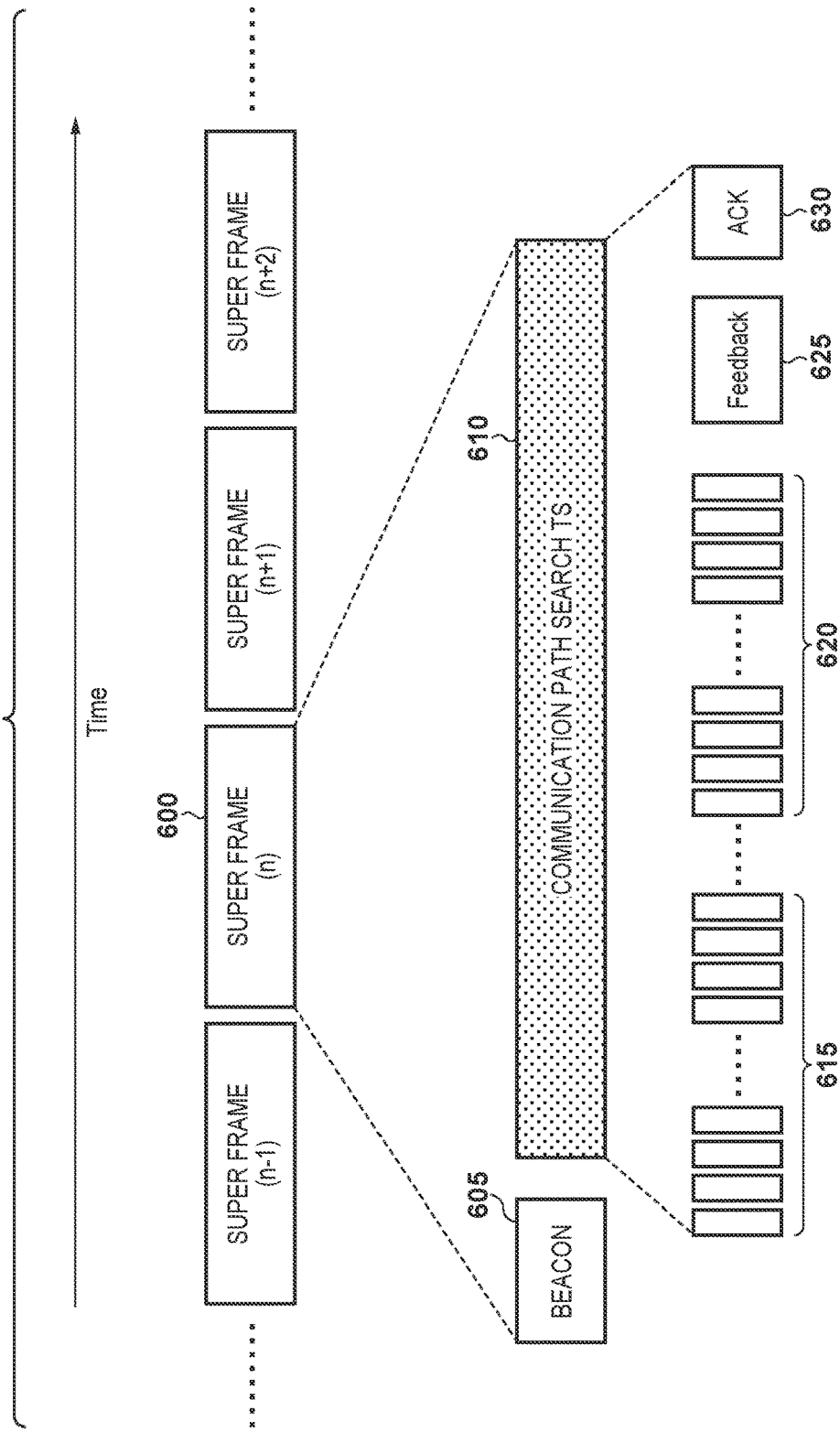
FIG. 6 is a view showing an arrangement example of a communication frame to be used in communication path search.
Figure 7:
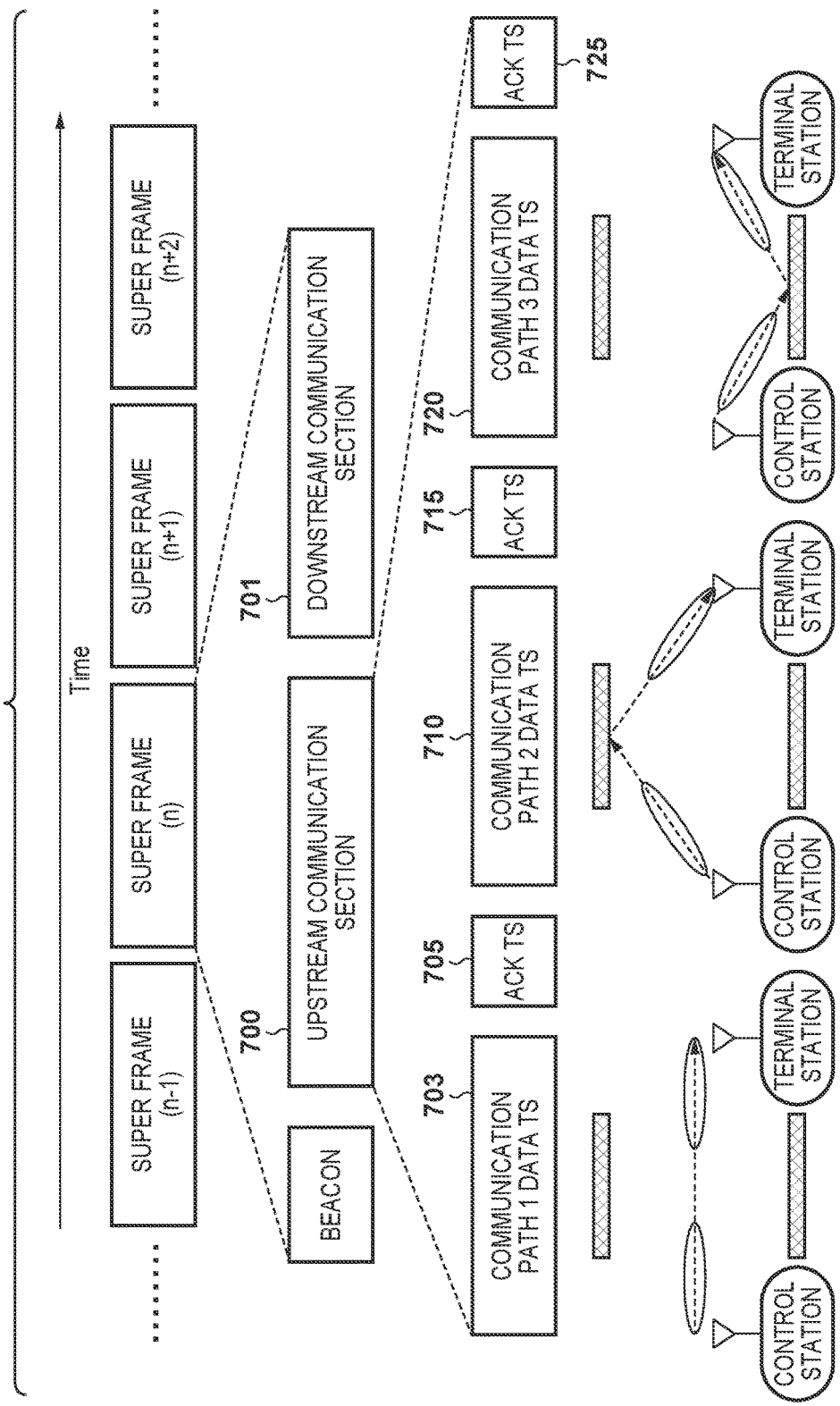
FIG. 7 is a view showing an arrangement example of a communication frame to be used in data transmission.

The configurations of communication frames will now be explained with reference to FIGS. 6 and 7. FIG. 6 is a view showing a configuration example of a communication frame to be used when performing communication path search (when setting the antenna direction). FIG. 7 shows a configuration example of a communication frame for data transmission to be performed after communication path search.

In the initial state, the control station and terminal station cannot specify an appropriate antenna direction. Before performing data communication, therefore, the control station and terminal station execute communication path search for specifying an appropriate antenna direction by using the frame configuration as shown in FIG. 6. Referring to FIG. 6, a super frame 600 is the unit of a fixed-length communication frame, and transmitted by a repetitive cycle corresponding to the effective period of application data. The super frame 600 includes two time-divisional regions, that is, a beacon 605 and a communication path search TS 610. The communication path search TS 610 is further divided into four regions 615, 620, 625, and 630.

The region 615 is a region by which the control station successively transmits training signals. In the region 615, the control station transmits training signals by switching the directions of the transmitting antenna, and the terminal station receives the signals. This makes it possible to search for a control station transmitting antenna direction which improves the reception state of the terminal station. The region 620 is a region by which the terminal station successively transmits training signals. In the region 620, the terminal station transmits training signals by switching the directions of the transmitting antenna, and the control station receives the signals. This makes it possible to search for a terminal station transmitting antenna direction which improves the reception state of the control station. The region 625 is a feedback TS by which the terminal station notifies the control station of the control station transmitting antenna direction having improved the reception state of the terminal station and information of the communication quality. Also, the region 630 is an ACK TS by which the control station notifies the terminal station that the feedback is correctly received.

Normally, a communication path search process using all combinations of transmitting/receiving antenna directions is not completed by one super frame processing. Therefore, the control station and terminal station execute the search process over a plurality of super frames, and finally select a plurality of communication paths which improve the communication state. The timing of the communication path search TS and information of the transmitting/receiving antenna direction to be used are stored in the TS allocation information of the beacon 605. Accordingly, the control station and terminal station can perform the communication path search process in accordance with this information.

After the communication path search, the control station and terminal station perform data communication by using the frame configuration as shown in FIG. 7. In this example shown in FIG. 7, the super frame includes an upstream communication section 700 and a downstream communication section 701. The upstream communication section 700 is a section for performing data transmission from the control station to the terminal station. The downstream communication section 701 is a section for performing data transmission from the terminal station to the control station.

Note that "upstream" and "downstream" herein mentioned are terms for convenience, and they may also be switched. The upstream communication section 700 includes a plurality of TSs for data in order to cope with the occurrence of an error by retransmission, and also includes acknowledgement TSs corresponding to these data TSs. Note that communication paths (antenna directions) to be used are set in one-to-one correspondence with the plurality of data TSs. That is, corresponding data TSs are set for two or more communication paths to be used in communication. In the example shown in FIG. 7, it is assumed that retransmission is performed a maximum of twice, and different transmitting/receiving antenna directions are set for the data TSs. The number of times of retransmission can be determined in accordance with the allowable delay time of data to be transmitted and the number of usable communication paths. A period 703 is a TS for transmitting data from the control station to the terminal station by using the first communication path (using, for example, a direct wave). A period 705 is a TS by which the terminal station transmits, to the control station, an acknowledgement (ACK/NAK) in response to the data received in the period 703. A period 710 is a TS for transmitting data from the control station to the terminal station by using the second communication path (using, for example, a reflected wave) different from the first communication path. A period 715 is a TS by which the terminal station transmits, to the control station, an acknowledgement (ACK/NAK) in response to the data received in the period 710. A period 720 is a TS for transmitting data from the control station to the terminal station by using the third communication path (using, for example, another reflected wave) different from the first and second communication paths. A period 725 is a TS by which the terminal station transmits, to the control station, an acknowledgement (ACK/NAK) in response to the data received in the period 720. Note that in the above-described acknowledgement transmitting periods, information indicating the reception state, such as SINR or RSSI, may also be transmitted instead of the acknowledgement. The timing of each TS and information of the transmitting/receiving antenna direction to be used are all stored in the TS allocation information of the beacon. Accordingly, the control station and terminal station can exchange data while switching the antenna directions of each TS at a predetermined timing in accordance with this information.

(Procedures of Processes)

The procedures of processes according to this embodiment will be explained below. First, outlines of the processes according to this embodiment will be explained with reference to FIGS. 8 to 10. Note that in the processes to be explained below, it is assumed that the communication path search process (direction setting process) using FIG. 6 is complete, and different antenna directions are used in the three data transmission TSs shown in FIG. 7. Assume also that the control station and terminal station perform data transmission (that is, data transmission in the control station, and data reception in the terminal station) in each data TS by using the set antenna direction.

Figure 8:
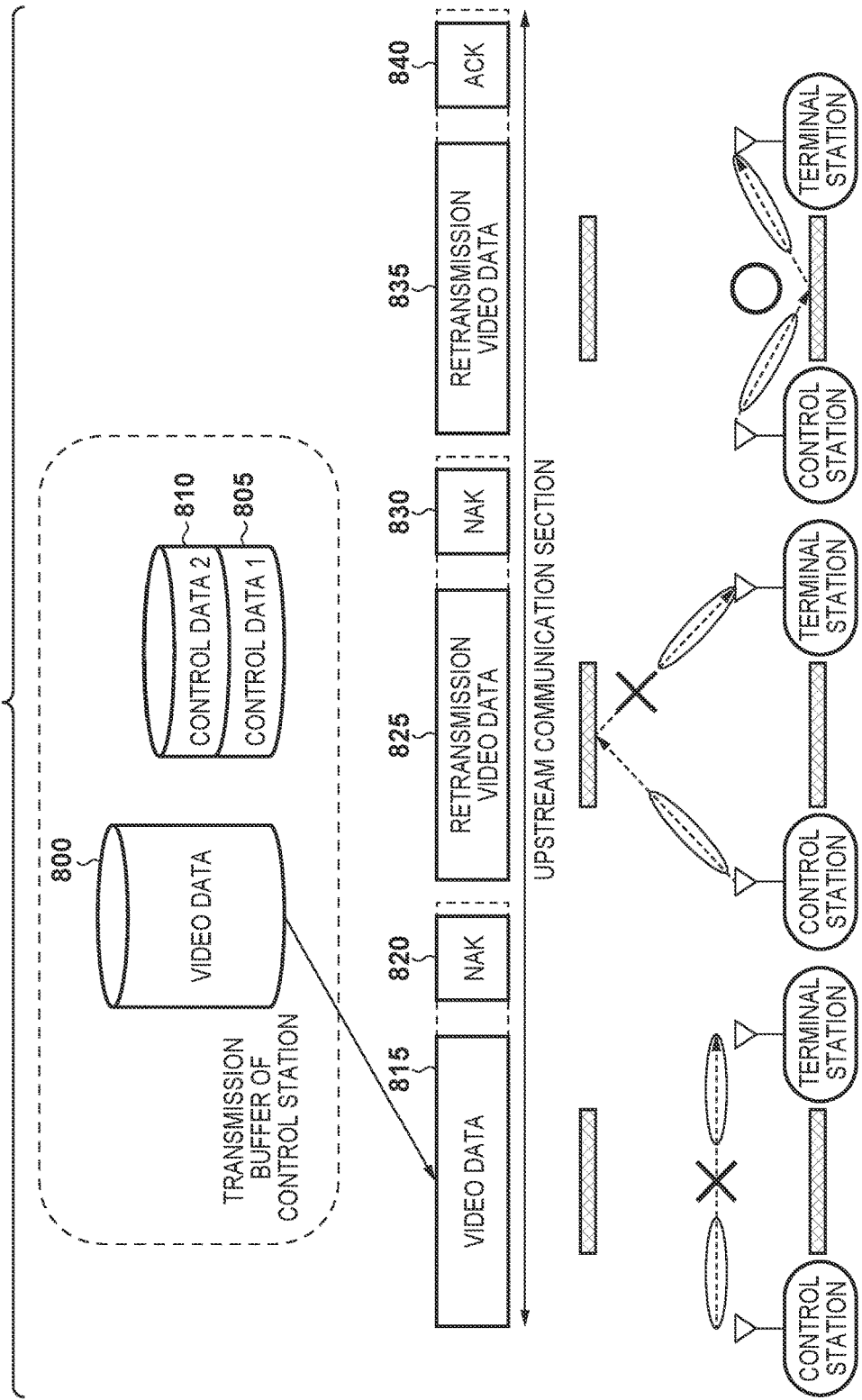
FIG. 8 is a conceptual view showing an example of data to be transmitted when retransmitting video data.

FIG. 8 is a view showing an example of data to be transmitted when retransmitting video data. Assume that video data 800 and control data 805 and 810 are stored in a transmission buffer of the control station. In this case, the control station first transmits the video data through the first communication path (by using the setting of the first antenna direction) in a first data transmission TS 815 in the upstream communication section. Assume that the terminal station has failed in receiving this video data. In this case, the terminal station transmits an NAK 820 to the control station in an acknowledgement TS 820. Since the control station has not received ACK (has received the NAK), the control station retransmits the video data through the second communication path in a second data TS 825. Assume that the terminal station has failed in receiving this video data again. Therefore, the terminal station transmits NAK to the control station in a corresponding acknowledgement TS 830. Since the control station has not received ACK (has received the NAK), the control station retransmits the video data through the third communication path in a third and last data TS 835. Assuming that the terminal station has succeeded in receiving the video data, the terminal station transmits ACK to the control station in a corresponding acknowledgement TS 840.

Note that the control data 805 and 810 are not transmitted in this case shown in FIG. 8, but these data are transmitted in the next super frame or the like. That is, the control data 805 and 810 are non-real-time data, and hence need not immediately be transmitted in the super frame shown in FIG. 8. On the other hand, the video data 800 is real-time data, and hence must completely be transmitted within one super frame. By contrast, as shown in FIG. 8, even if communication by one communication path fails between the control station and the terminal station, the video data is immediately retransmitted by another communication path for which a different antenna direction is set. This makes it possible to prevent a delay of transmission of real-time data. In this case, the video data is transmitted in all data transmission TSs, so the control station and terminal station can monitor the communication quality of each communication path.

Figure 9:
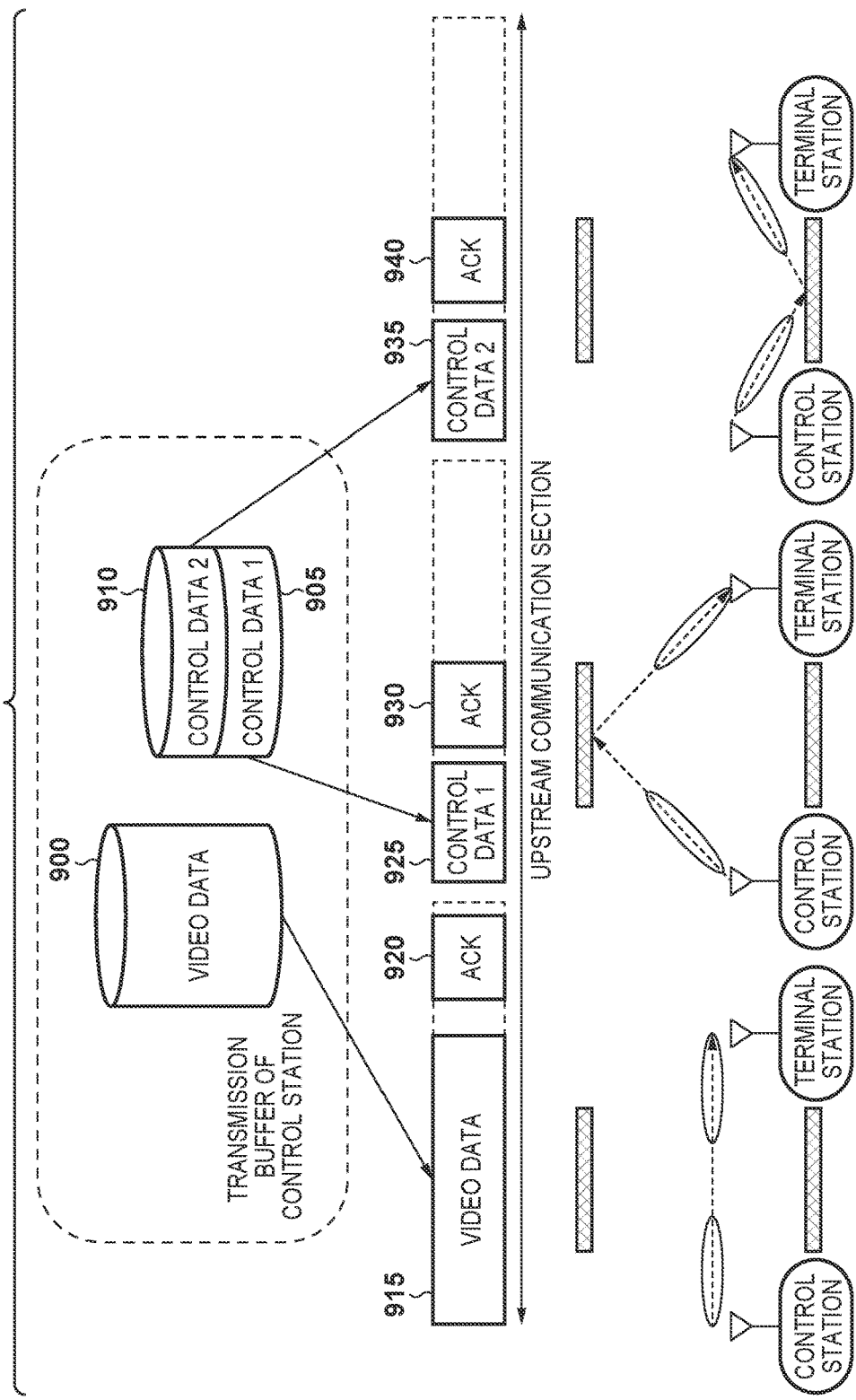
FIG. 9 is a conceptual view showing the first example of data to be transmitted when transmitting control data.

FIG. 9 is a view showing an example of data to be transmitted when transmitting a plurality of pieces of control data without retransmitting video data. Similarly to the example shown in FIG. 8, video data 900 and control data 905 and 910 are stored in a transmission buffer of the mobile station. In this example, the control station transmits the video data through the first communication path (by using the setting of the first antenna direction) in a first data TS 915 in an upstream communication section. Assume that the terminal station has succeeded in receiving this video data. Then, the terminal station transmits ACK in an acknowledgement TS 920. Upon receiving this ACK, the control station can recognize that retransmission of the video data is unnecessary. In this case, therefore, the control station determines whether control data exists by checking the transmission buffer. In this case, the plurality of control data exist in the transmission buffer. Therefore, the control station transmits these control data in remaining data transmission TSs in the upstream communication section. That is, the control station transmits the first control data 905 through the second communication path in a second data transmission TS 925. The terminal station having succeeded in receiving the control data 905 transmits ACK to the control station in an acknowledgement TS 930 corresponding to the second data transmission TS 925. Also, the control station transmits the second control data 910 through the third communication path in a third and last data transmission TS 935. The terminal station having succeeded in receiving the control data 910 transmits ACK to the control station in an acknowledgement TS 940 corresponding to the third data transmission TS 935.

Figure 10:
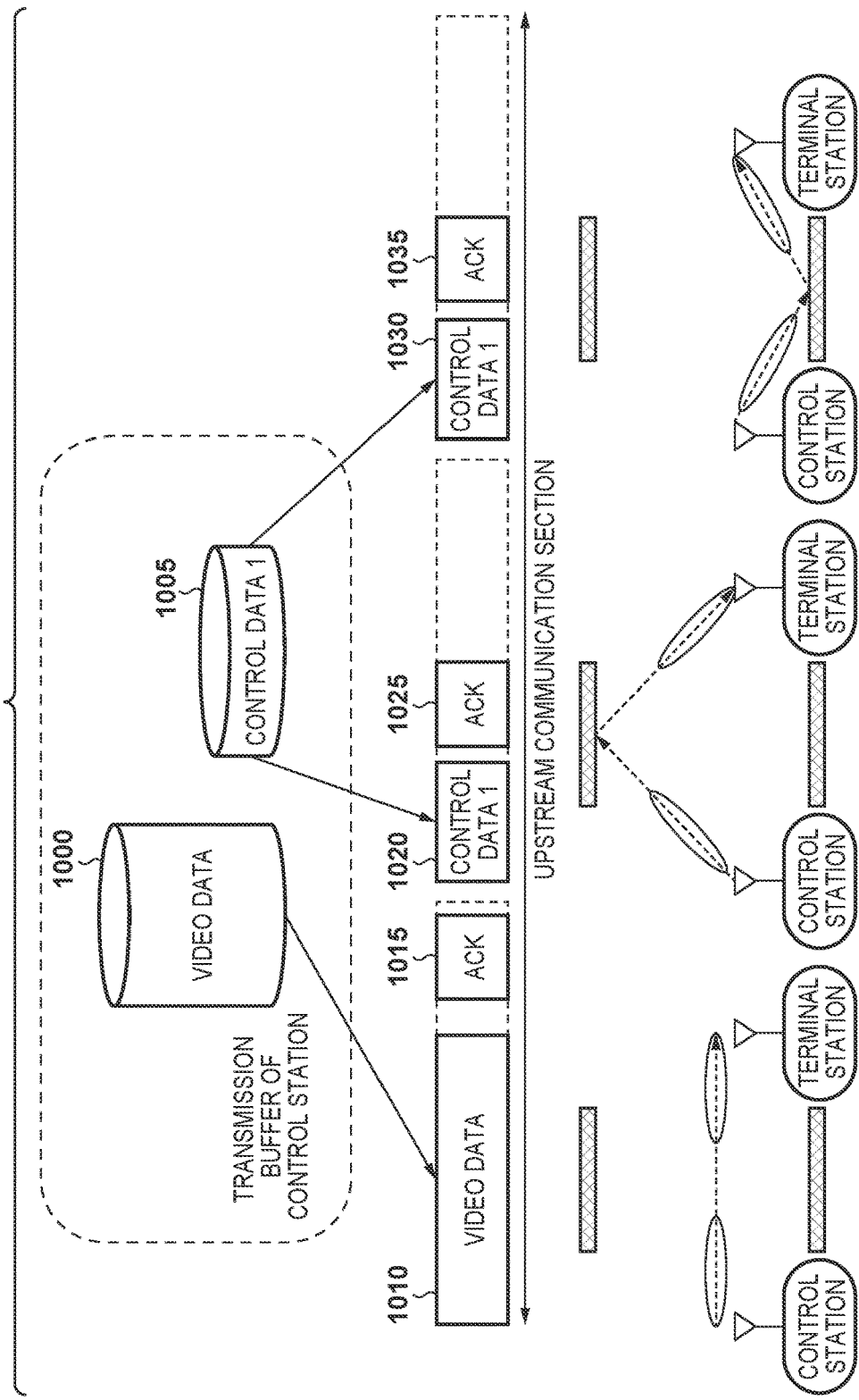
FIG. 10 is a conceptual view showing the second example of the data to be transmitted when transmitting the control data.

FIG. 10 is a view showing an example of data to be transmitted when transmitting one control data without retransmitting video data. Referring to FIG. 10, video data 1000 and control data 1005 are stored in a transmission buffer of the mobile station. In this example, it is assumed that, similarly to the example shown in FIG. 9, the video data is transmitted by using the first communication path in a first data transmission TS 1010 in an upstream communication section, and the terminal station has succeeded in receiving this video data. Consequently, the terminal station transmits ACK to the control station in an acknowledgement TS 1015. The control station receives the ACK, and transmits not the video data but the control data in a data transmission TS after that. In this case, the control station checks the transmission buffer, detects that one control data exists, and repetitively transmits the control data over a plurality of TSs. That is, the control station transmits the control data 1005 by using the second communication path in a second data transmission TS 1020, and transmits the same control data 1005 by using the third communication path in a third data transmission TS 1030. Assuming that the terminal station has succeeded in receiving each of the control data 1005 transmitted the plurality of times, the terminal station transmits ACK to the control station in acknowledgement TSs 1025 and 1035 respectively corresponding to the second and third data transmission TSs 1020 and 1030. Note that the control data 1005 transmitted in the second and third data transmission TSs 1020 and 1030 can be the same or different. That is, configuration may be taken to retransmit the same data, or transmitting after dividing one data into two parts. The control station can also form two signals by adding two different redundancy components to the same control data 1005, and transmits these two signals in the second and third data transmission TSs 1020 and 1030.

As described above, even when it is unnecessary to retransmit video data, control data is transmitted by using a free data transmission TS. Thus, the control station and terminal station can monitor the communication quality of a plurality of different communication paths using a plurality of different antenna directions, that is, can monitor whether signal exchange is possible. Also, as shown in FIG. 9, when holding a plurality of control data, the control station transmits the data by dispersing the data into a plurality of TSs, instead of collectively transmitting the data by one TS. This makes it possible to comprehensively monitor the states of a plurality of communication paths. Furthermore, as shown in FIG. 10, when holding one control data as a transmission target, the control station can comprehensively monitor the states of a plurality of communication paths by transmitting the same control data a plurality of times by a plurality of TSs. Also, when the same control data is transmitted a plurality of times, the error resistance of the control data can be improved. Note that in the example shown in FIG. 9, it is also possible to collectively transmit the plurality of control data 905 and 910 by one TS, and repeat the transmission a plurality of times in a plurality of TSs.

Figure 11:
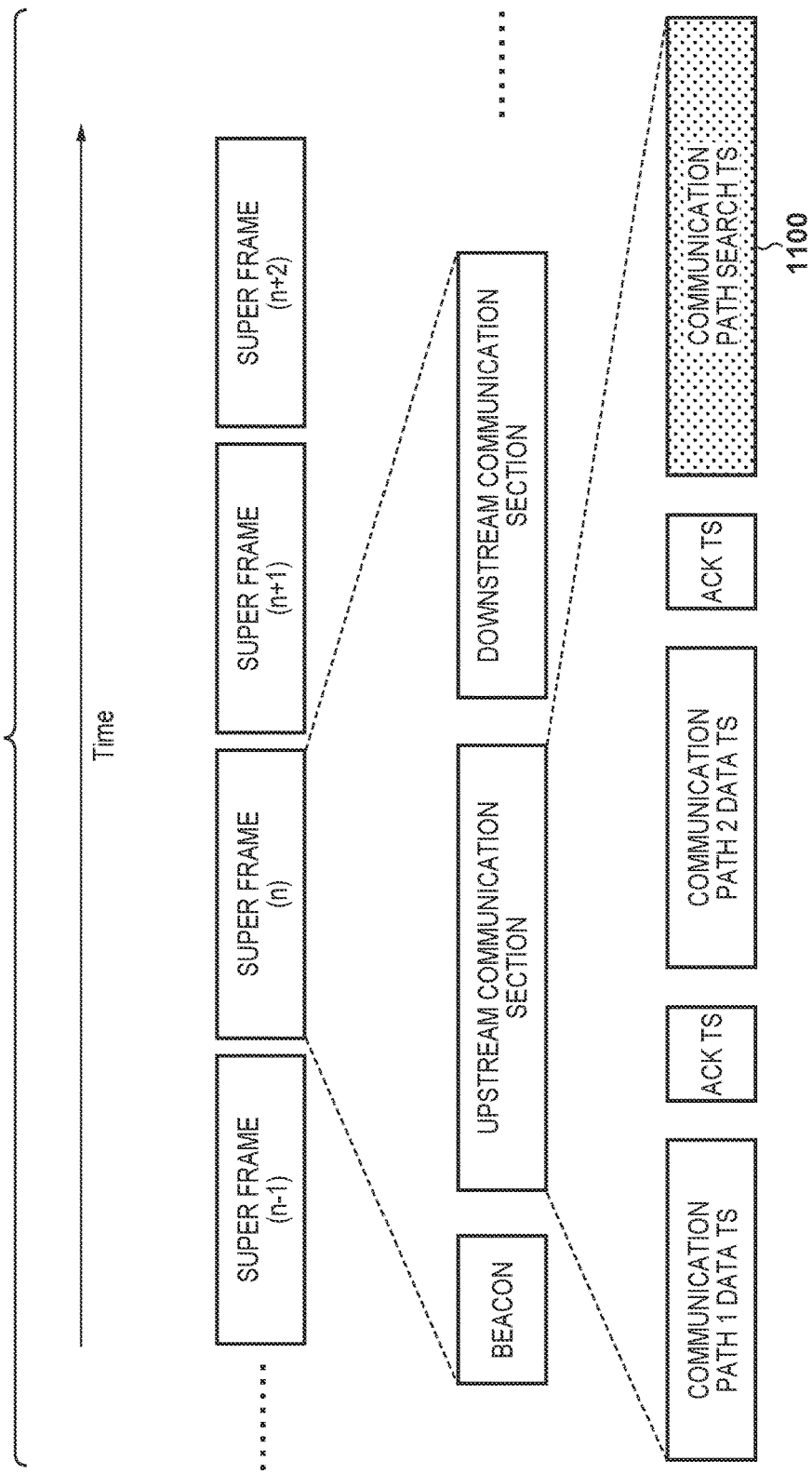
FIG. 11 is a view showing an example of time slot allocation to be used in communication path research.

As described above, the control station and terminal station can monitor the states of a plurality of set communication paths by transmitting data through the plurality of communication paths regardless of whether retransmission is necessary. A case in which a communication path research process is performed when the control station and terminal station determine by monitoring that no satisfactory communication quality can be obtained from a given communication path will be explained below with reference to FIG. 11. FIG. 11 shows TS allocation in an upstream communication section when performing communication path research. As a result of monitoring of the ACK reception state by transmitting data as shown in FIGS. 8 to 10, if no ACK can be received over a predetermined period for a TS according to a given communication path, the control station determines that the communication path is unusable, and activates communication path research. In this case, a data TS and acknowledgement TS allocated to the communication path found to be unusable are used as TSs for communication path research. Assume that at least no ACK is received over a predetermined period or NAK is received in the third data TS shown in FIGS. 8 to 10, and the control station determines that the communication path to be used in the third data TS is unusable. In this case, as shown in FIG. 11, the control station allocates the section of the third data TS and a corresponding acknowledgement TS as a communication path research TS 1100. Then, the control station and terminal station search for a communication path (that is, the setting of the antenna direction) by which satisfactory communication quality is obtained, by using the communication path research TS 1100.

Figure 12:
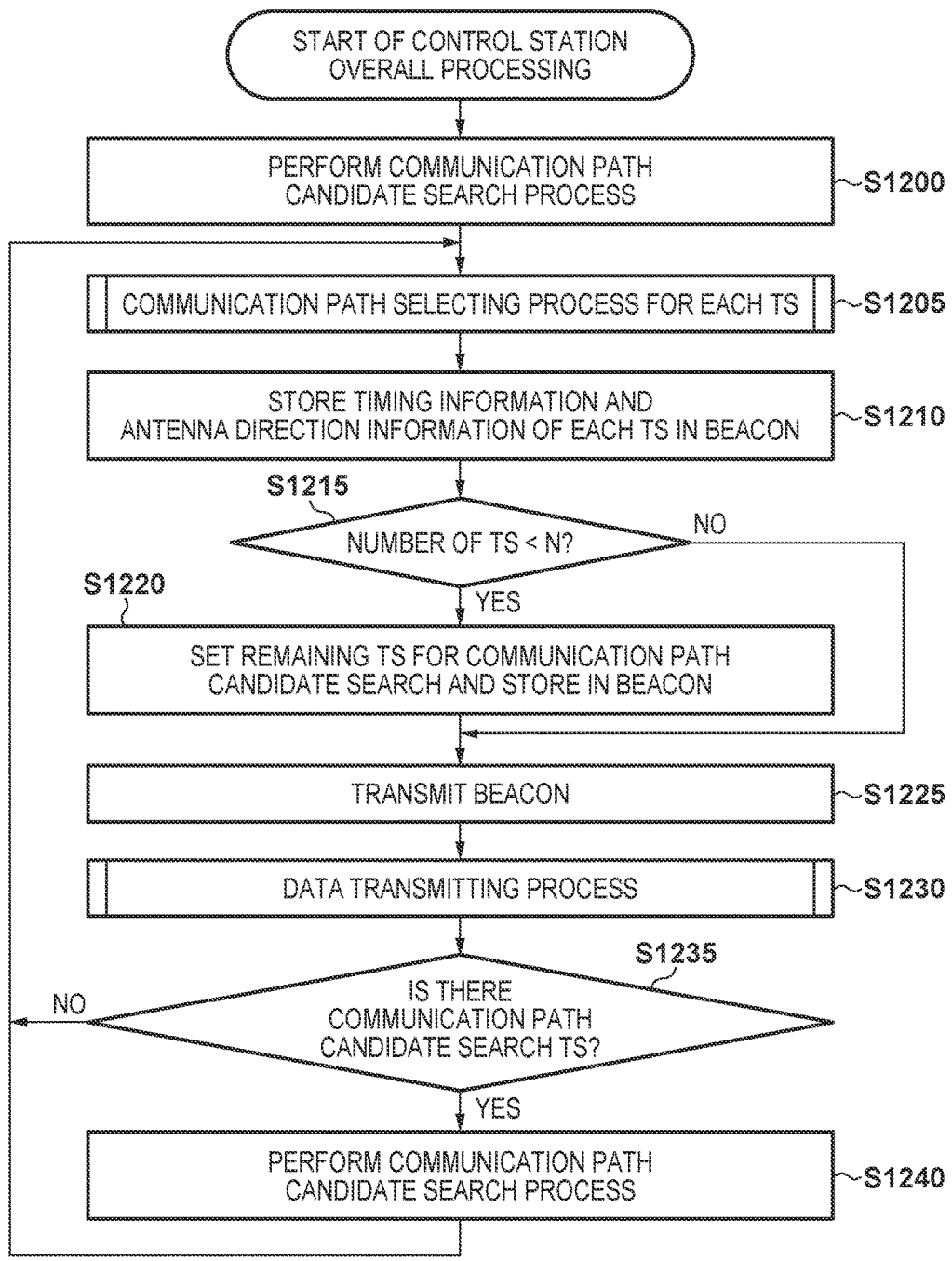
FIG. 12 is a flowchart showing an example of the procedure of a process to be executed by the control station.

The procedures of processes to be executed by the control station and terminal station will be explained below with reference to FIGS. 12 to 16. FIG. 12 is a flowchart showing an example of the procedure of a process to be executed by the control station when transmitting data from the control station to the terminal station.

First, before performing data transmission, the control station executes a communication path candidate search process with respect to the terminal station (step S1200). Then, based on the result of the search process in step S1200, the control station performs a process of selecting a communication path (that is, the setting of the antenna direction) to be used in each TS in a super frame (step S1205). Details of the process in step S1205 will be described later with reference to FIG. 13. Subsequently, based on the communication path of each TS selected in step S1205, the control station stores, as TS allocation information, timing information and information of the transmitting/receiving antenna direction of each TS in a beacon (step S1210). After that, the control station checks whether the number of TSs to which communication paths are allocated has reached N as a maximum number in the super frame (step S1215). If the number of TSs to which communication paths are allocated has reached the maximum number (NO in step S1215), the process advances to step S1225 by skipping over step S1220. If the number of TSs has not reached the maximum number (YES in step S1215), the process advances to step S1220. In step S1220, a TS to which no communication path is allocated is set as a communication path search TS, and this information is stored in the beacon. That is, if the number of communication paths by which satisfactory communication quality is obtained has not reached the maximum number of TSs, no communication paths may be set for some TSs. In this case, communication path search is successively performed in this TS, and, if a communication path having satisfactory communication quality can be found due to a status change, this communication path having satisfactory communication quality can be set for the TS. Then, the control station transmits the beacon to the terminal station in step S1225. After that, the control station performs a data transmitting process based on the timing of each TS and the antenna direction information contained in the TS allocation information of the beacon (step S1230). Details of the process in step S1230 will be described later with reference to FIG. 14. After that, the control station determines whether a communication path candidate search TS is allocated (step S1235). If this TS is allocated (YES in step S1235), the control station executes the communication path candidate search process in step S1240. On the other hand, if no communication path candidate search TS is allocated (NO in step S1235), the process returns to step S1205, and the above-described process is repeated.

Figure 13:
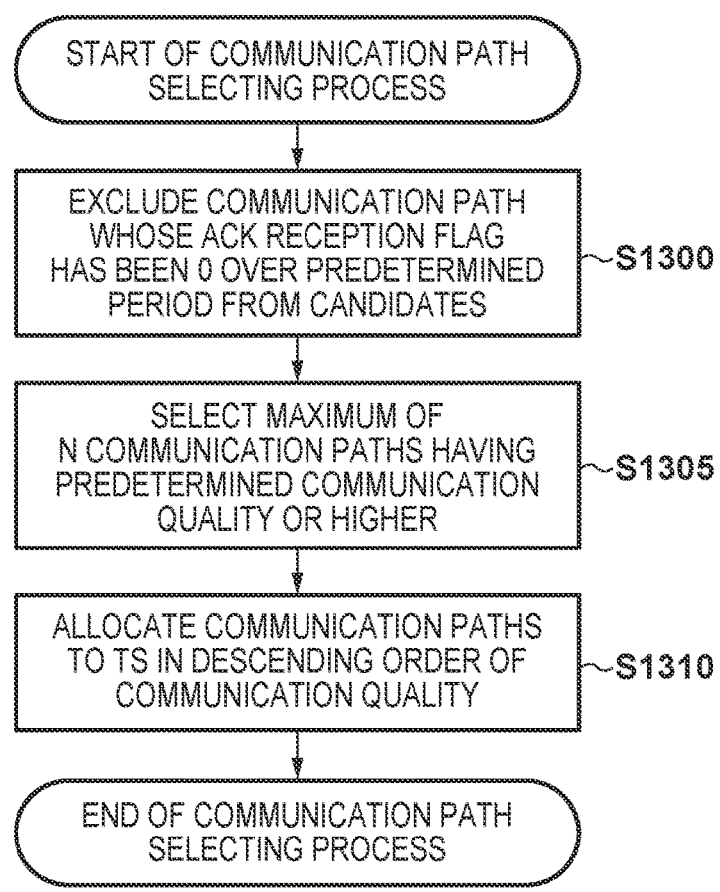
FIG. 13 is a flowchart showing an example of the procedure of a communication path selecting process.

The communicating path selecting process in step S1205 described above will be explained below with reference to FIG. 13. First, the control station checks an ACK reception flag of each communication path. The ACK reception flag is a flag which changes to 1 when ACK can be received from the terminal station when transmitting data by a predetermined communication path, and changes to 0 if no ACK can be received. As a result of this check, the control station determines that the state of a communication path for which the ACK reception flag is 0 for a predetermined period is unsatisfactory, and excludes this communication path from communication path candidates to be allocated to a TS (step S1300). Then, based on the result of the communication path candidate search process, the control station selects a maximum of N communication paths having a predetermined communication quality or higher (step S1305). As described previously, N is the maximum number of data transmission including retransmission in the super frame. Finally, the control station allocates the communication paths selected in step S1305 to TSs from the first TS in, for example, descending order of communication quality. By allocating a communication path having high communication quality to a TS to be transmitted earlier, an expected value of the number of times of retransmission of video data presumably reduces.

Figure 14:
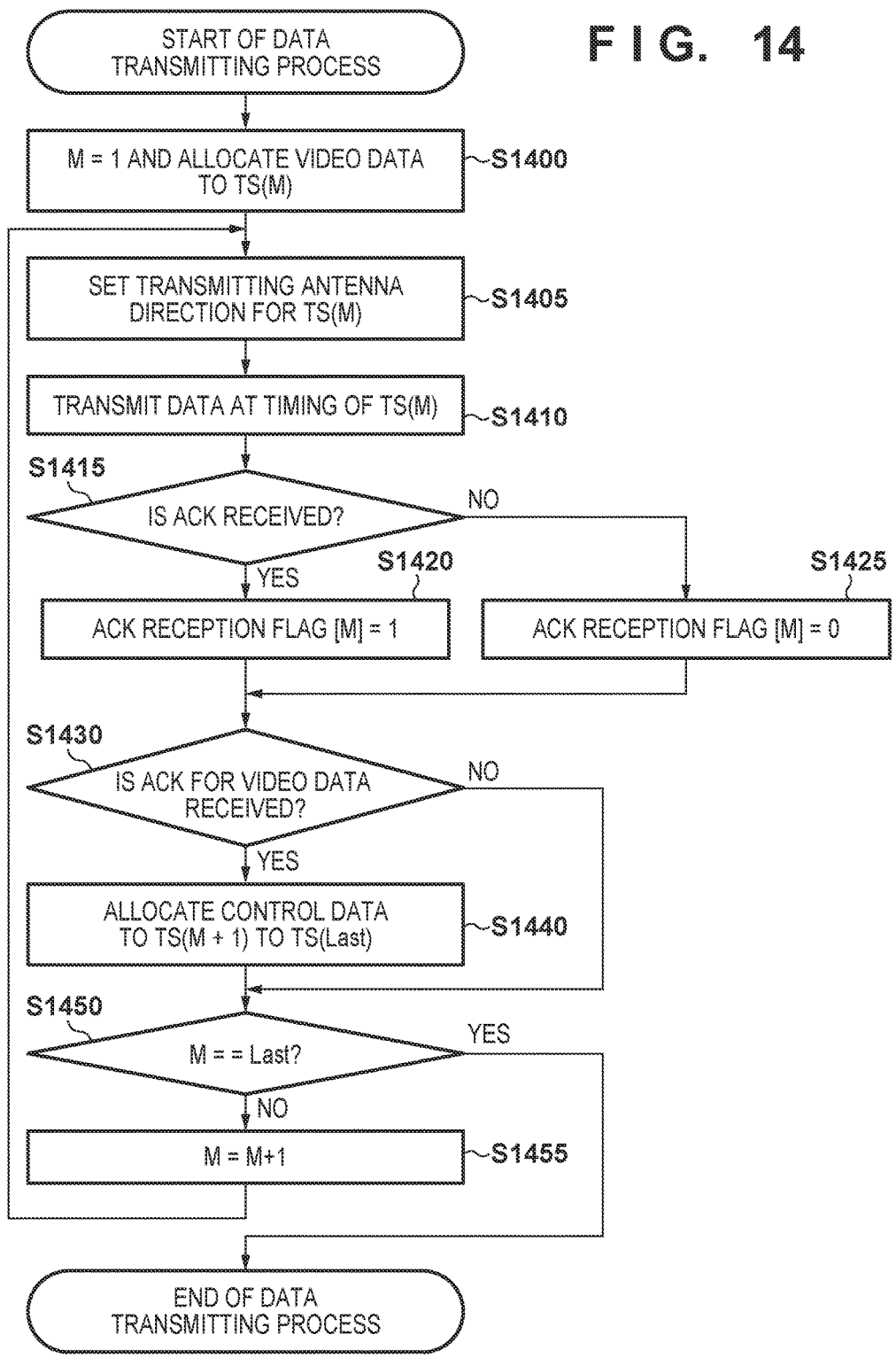
FIG. 14 is a flowchart showing an example of the procedure of a data transmitting process.

An example of the procedure of the data transmitting process in step S1230 will be explained below with reference to FIG. 14. First, the control station sets M as a present TS number at 1, and allocates video data to the first TS (step S1400). Then, the control station sets the direction of a transmitting antenna for the Mth TS in accordance with TS allocation information to be transmitted by a beacon (step S1405). Subsequently, the control station transmits the data at the timing of the Mth TS in accordance with the TS allocation information of the beacon (step S1410). After transmitting the data, the control station determines whether ACK is received from the terminal station (step S1415). If ACK is received (YES in step S1415), the control station sets an ACK reception flag of the Mth TS to 1 (step S1420); if not (NO in step S1415), the control station sets the ACK reception flag to 0 (step S1425). Then, the control station checks whether ACK is received for transmission of the video data (step S1430). If ACK for transmission of the video data is received (YES in step S1430), the control station transmits control data by using a remaining TS (step S1440). If no ACK is received (NO in step S1430), the control station retransmits video data by using a remaining TS (step S1410).

In step S1440, the control station checks control data in its own transmission buffer, and allocates control data stored in the transmission buffer to a remaining TS. If a plurality of control data exist and a plurality of TSs remain, the control station allocates the plurality of control data by dispersing them to the plurality of TSs. If the number of control data is smaller than the number of remaining TSs, it is also possible to allocate the same control data to a plurality of TSs. Note that when a plurality of control data can be transmitted in one data transmission TS, it is possible to allocate a plurality of control data to a plurality of data transmission TSs, and repetitively transmit the control data.

After that, the control station determines whether M as the present TS number has reached Last as the last TS number (step S1450). If the present TS is the last TS (YES in step S1450), the control station terminates the data transmitting process. On the other hand, if the present TS is not the last TS (NO in step S1450), the control station increments the value of M by 1 (step S1455), returns the process to step S1405, and continues the transmitting process by using a remaining TS.

The control station thus transmits video data by the first TS. If ACK for transmission of the video data can be received, the control station transmits control data by a remaining TS. If no ACK for transmission of the video data can be received, the control station retransmits the video data. Consequently, communication is performed by using all antenna directions set for a plurality of TSs, so the control station and terminal station can monitor the communication quality of each communication path.

Figure 15:
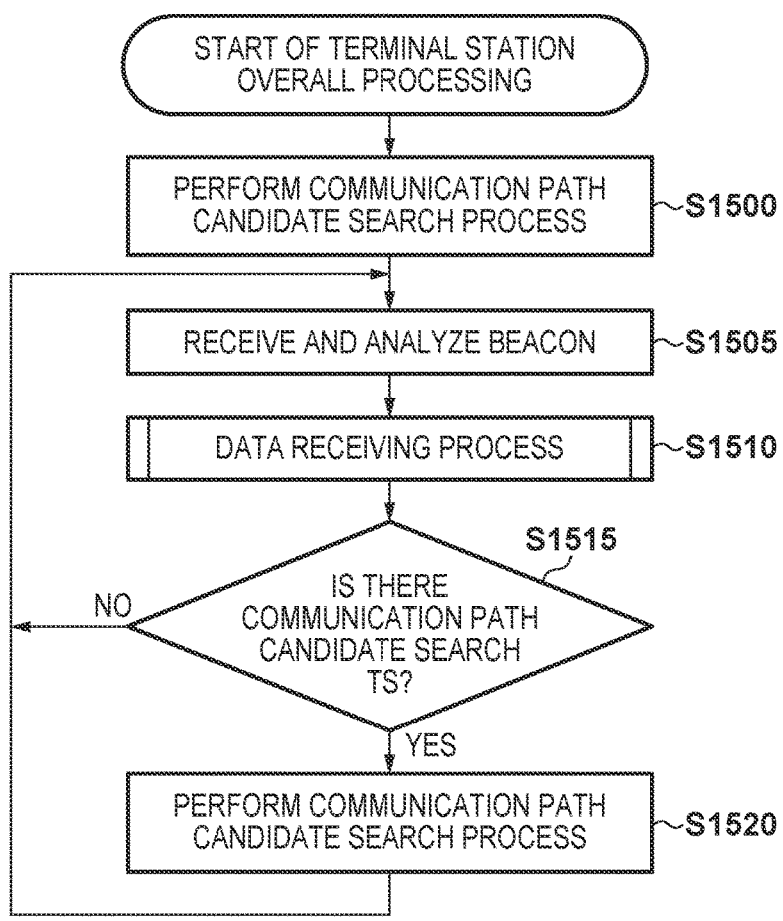
FIG. 15 is a flowchart showing an example of the procedure of a process to be executed by the terminal station.

The procedure of a process to be executed by the terminal station, that is, an apparatus on the data receiving side when transmitting data from the control station to the terminal station will be explained below with reference to FIG. 15. First, before transmitting data, the terminal station executes a communication path candidate search process with respect to the control station (step S1500). Then, the terminal station analyzes a beacon received from the control station, and acquires TS allocation information containing timing information and information of the antenna direction of each TS (step S1505). Subsequently, the terminal station performs a data receiving process based on the timing and the antenna direction information of the TS allocation information (step S1510). Details of the process in step S1510 will be described later with reference to FIG. 16. After the data receiving process, the terminal station determines whether a TS for communication path candidate search is allocated (step S1515). If this TS is allocated (YES in step S1515), the terminal station executes a communication path candidate search process (step S1520). On the other hand, if no communication path candidate search TS is allocated (NO in step S1515), the terminal station returns the process to step S1505, and repeats the process.

Figure 16:
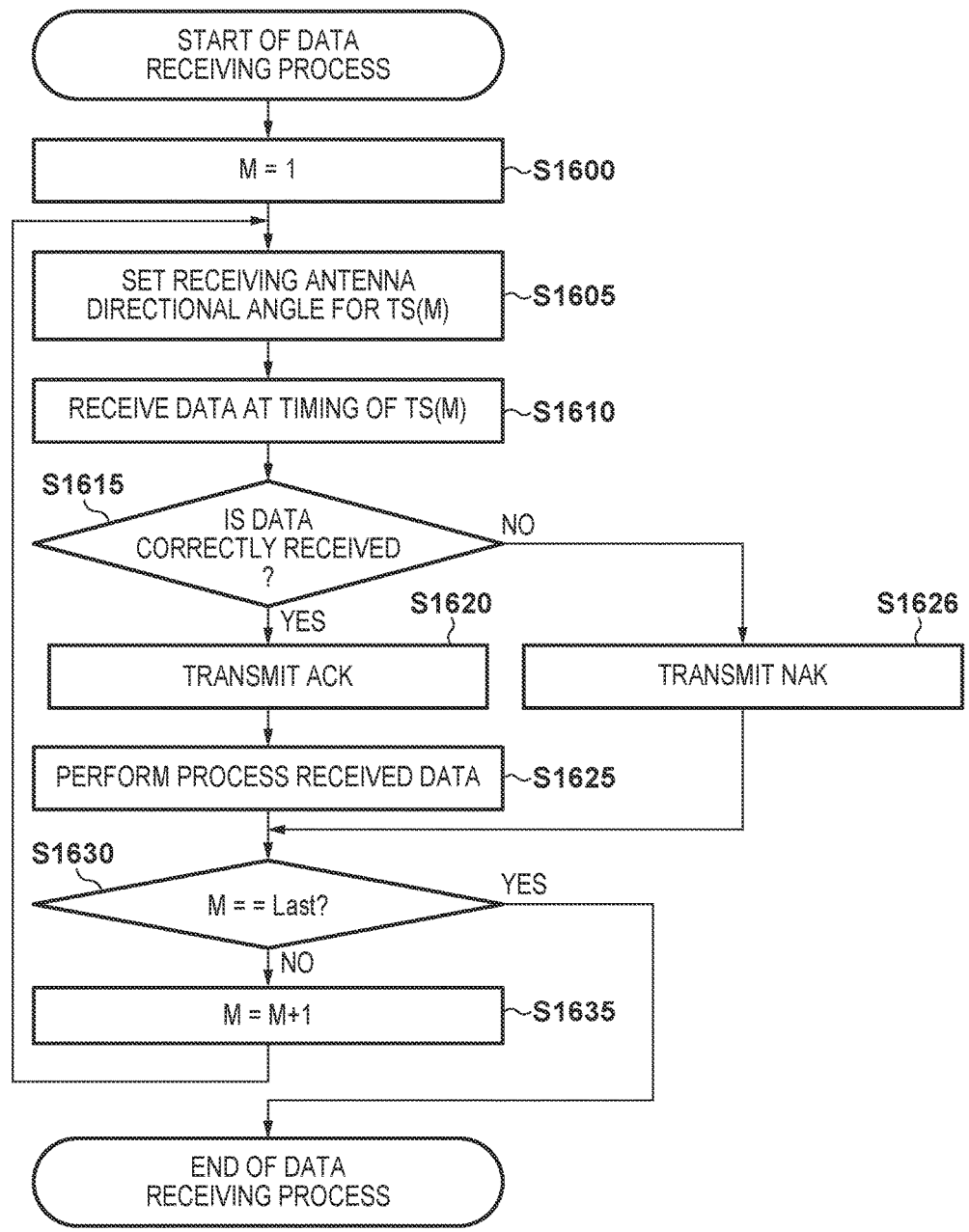
FIG. 16 is a flowchart showing an example of the procedure of a data receiving process.
Figure 17:
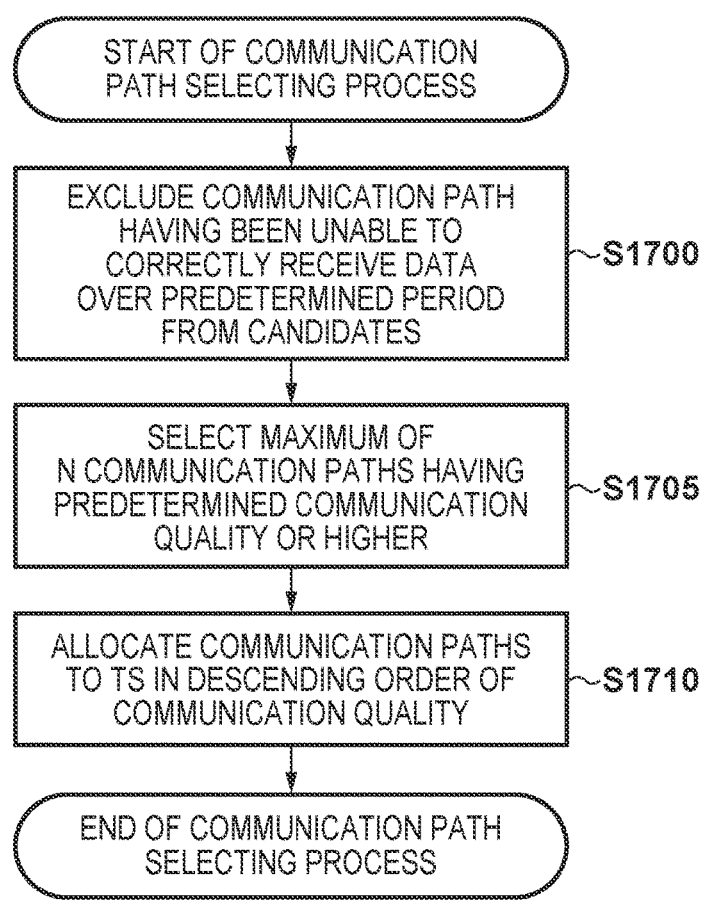
FIG. 17 is a flowchart showing an example of the procedure of the communication path selecting process when the control station is an apparatus on the data receiving side.

An example of the procedure of the data receiving process in step S1510 will be explained below with reference to FIG. 16. In this data receiving process, the terminal station first sets M as the present TS number to 1 (step S1600), and sets the direction of a receiving antenna for the Mth TS based on received beacon information (step S1605). Then, the terminal station receives data in accordance with the timing of the Mth TS based on the beacon information (step S1610), and determines whether the data is successfully received (step S1615). If data reception is successful (YES in step S1615), the terminal station transmits ACK to the control station (step S1620), and transfers the received video data or control data to an application for processing the data (step S1625). On the other hand, if data reception is unsuccessful (NO in step S1615), the terminal station transmits NAK to the control station (step S1626). Note that the terminal station can explicitly notify the control station of the failure of reception by transmitting NAK, but can also implicitly notify the control station of the failure of reception by transmitting no ACK. After that, the terminal station determines whether M as the present TS number has reached Last as the last TS number (step S1630). If the present TS is the last TS (YES in step S1630), the terminal station terminates the data receiving process. On the other hand, if the present TS is not the last TS (NO in step S1630), the terminal station increments the value of M by 1 (step S1635), returns the process to step S1605, and continues the receiving process in a remaining TS. Note that the terminal station can previously know that control data is transmitted in a TS after preferentially transmitted video data is successfully received, and hence can determine whether the received signal is video data or control data.

In the above-described explanation, the communication station 102 of the HMD 100 operates as a control station, and the communication station 103 of the PC 101 operates as a terminal station. However, these roles may also be switched. That is, the communication station 102 of the HMD 100 may also operate as a terminal station, and the communication station 103 of the PC 101 may also operate as a control station. The procedure of a process of the control station (that is, the communication station 103 of the PC 101) in this case will be explained. The process to be executed by the control station is basically the same as the example shown in FIG. 12. In step S1230, however, the control station executes the data receiving process as shown in FIG. 15. Also, as the communication path selecting process in step S1205, the control station executes a process shown in FIG. 17, instead of the process shown in FIG. 13. In this process, the control station does not select a communication path based on the ACK reception flag received from the terminal station as shown in step S1300. Since the control station itself is a data receiving station, the control station selects a communication path based on the reception state of data from the terminal station (step S1700). That is, the control station determines whether the data transmitted from the terminal station is successfully received, and excludes a communication path which has not succeeded in data reception over a predetermined period from communication path candidates as selection targets. The rest of the process is the same as that shown in FIG. 13. Note that in this case, the terminal station (that is, the communication station 102 of the HMD 100) executes in step S1510 not the data receiving process as shown in FIG. 16, but the data transmitting process shown in FIG. 14. The rest of the process of the terminal station is the same as that shown in FIG. 15.

Figure 18:
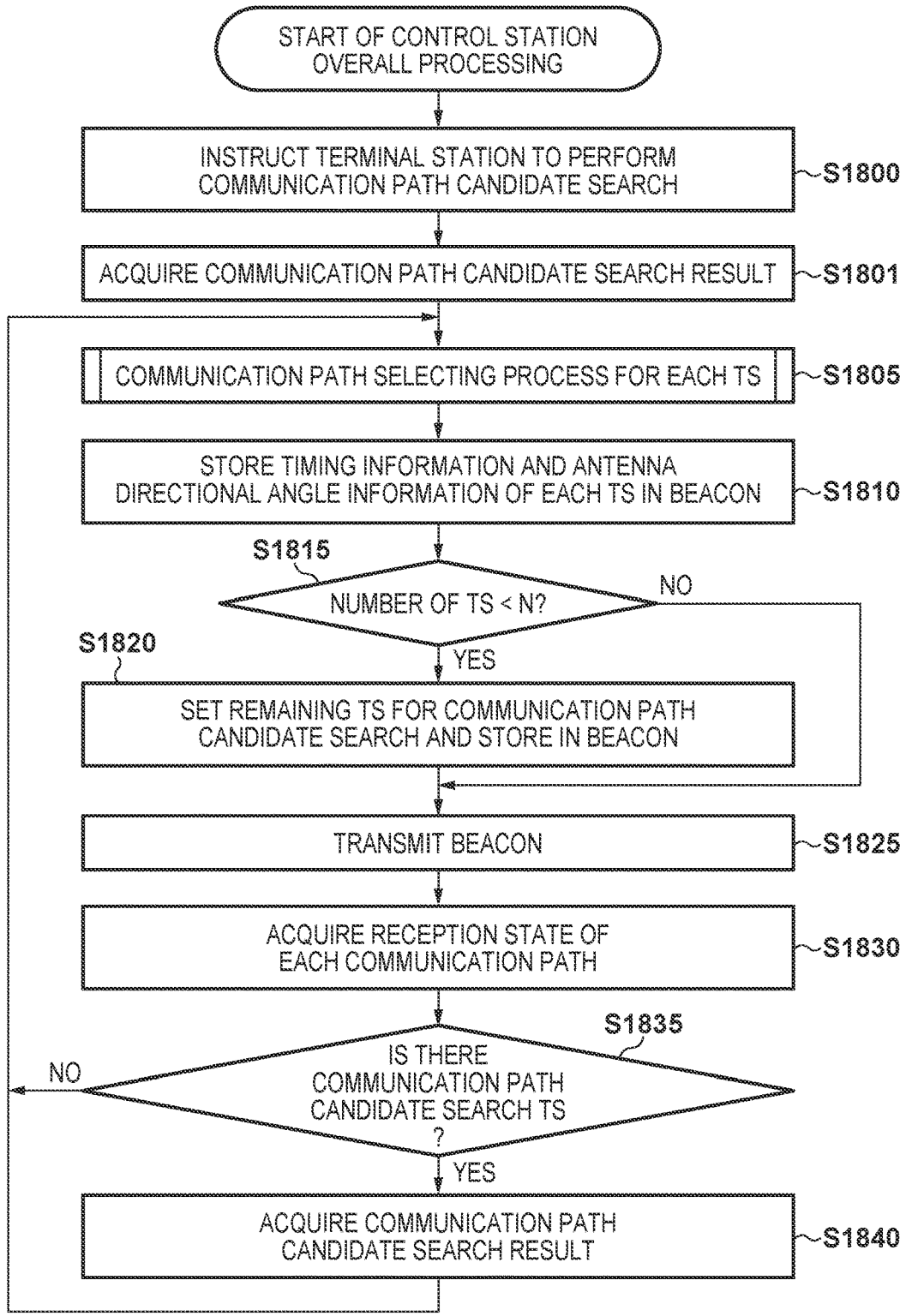
FIG. 18 is a flowchart showing an example of the procedure of a process to be executed by the control station, when the control station is an apparatus different from apparatuses on the transmitting side and receiving side.

In addition, the communication station 102 of the HMD 100 operates as a control station and the communication station 103 of the PC 101 operates as a terminal station in the above-described explanation, but the control station may also be a communication station different from the communication stations 102 and 103 of the HMD 100 and PC 101. A process in this case will be explained with reference to FIGS. 18 and 19. FIG. 18 is a flowchart showing an example of the procedure of the process to be executed by the control station.

First, before performing data transmission with respect to the communication stations 102 and 103 (both of which are terminal stations) of the HMD 100 and PC 101, the control station instructs these terminal stations to perform a communication path candidate search process (step S1800). Then, the control station acquires the communication path candidate search result from a terminal station on the data transmitting side (step S1801). Subsequently, based on the result acquired in step S1801, the control station performs a process of selecting a communication path to be used in each TS in a super frame (step S1805). This process in step S1805 is the same as that in step S1205 of FIG. 12. After that, based on the communication path of each TS selected in step S1805, the control station stores, as TS allocation information, timing information and information of the transmitting/receiving antenna direction of each TS in a beacon (step S1810). Then, the control station checks whether the number of TSs to which communication paths are allocated has reached N as a maximum number (step S1815). If the number of TSs to which communication paths are allocated has reached the maximum number (YES in step S1815), the control station advances the process to step S1825 by omitting step S1820. On the other hand, if the number of TSs to which communication paths are allocated has not reached the maximum number (NO in step S1815), the control station sets a remaining TS as a communication path search TS, and stores this information in the beacon (step S1820). In step S1825, the control station transmits the beacon to the terminal station. To acquire the reception state of each communication path, the control station acquires reception flag information of ACK from the terminal station on the data transmitting side (step S1830). Note that the control station may also acquire information of the reception state from a terminal station on the data receiving side, instead of acquiring the reception flag information of ACK from the terminal station on the data transmitting side. Based on this information, the control station can reselect a communication path in step S1805. The control station determines whether a communication path candidate search TS is allocated (step S1835). If this TS is allocated (YES in step S1835), the control station acquires the communication path candidate search result from the terminal station on the data transmitting side (step S1840). On the other hand, if no communication path candidate search TS is allocated (NO in step S1835), the process returns to step S1805, and the above-described process is repeated.

An example of the procedure of a process to be executed by the terminal station on the data transmitting side in this case will be explained with reference to FIG. 19. First, before performing data transmission, the terminal station on the data transmitting side executes a communication path candidate search process with respect to the terminal station on the data receiving side in accordance with an instruction from the control station (step S1900). The terminal station on the data transmitting side notifies the control station of the search result of the communication path candidate (step S1901). Then, the terminal station on the data transmitting side analyzes a beacon received from the control station, and acquires TS allocation information containing timing information and information of the antenna direction of each TS (step S1905). Based on the timing and the information of the antenna direction of the TS allocation information, the terminal station on the data transmitting side performs a data transmitting process (step S1910). This process in step S1910 is the same as that in step S1230 of FIG. 12. After that, the terminal station on the data transmitting side notifies the control station of an ACK reception flag indicating the reception state of ACK of each communication path (step S1915). The terminal station on the data transmitting side determines whether a communication path candidate search TS is allocated (step S1920). If this TS is allocated, (YES in step S1920), the terminal station on the data transmitting side executes a communication path candidate search process (step S1925), and notifies the control station of the result (step S1930). If no communication path candidate search TS is allocated (NO in step S1920), the terminal station on the data transmitting side returns the process to step S1905, and repeats the above-described process. Note that the procedure of the process of the terminal station on the data receiving side can be the same as that shown in FIG. 15.

In this embodiment as described above, in the first TS, video data (that is, real-time data/preferential data) is transmitted by using the first communication path using the first antenna direction. If the transmission/reception of this video data is unsuccessful, the video data is retransmitted in the second TS different from the first TS by using the second communication path using the second antenna direction different from the first antenna direction. On the other hand, if the transmission/reception of the video data is successful, control data (non-real-time data/non-preferential data) is transmitted in the second TS by using the second communication path using the second antenna direction. That is, regardless of whether the transmission/reception of data using the first communication path is successful or unsuccessful, at least one of video data and control data is transmitted by using all antenna directions set for TSs. Accordingly, a communication apparatus for performing data transmission/reception and a partner apparatus of the communication can always monitor the state of a set communication path. If the communication quality deteriorates when a given communication path is used, communication path research is performed using the TS for which the given communication path is set. This makes it possible to set a plurality of communication paths having a high communication quality for a plurality of TSs. Also, when a TS capable of transmitting video data becomes free, control data is transmitted by using this TS. Since it is unnecessary to additionally secure a TS dedicated for control data, communication bands can efficiently be used.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-225084, filed Nov. 17, 2015 which is hereby incorporated by reference herein in its entirety.

What is claimed is:

1. A communication apparatus comprising:
one or more processors; and
a memory including instructions stored thereon that, when executed by the one or more processors, cause the communication apparatus to:

set a first antenna direction to be used in a first time slot among a plurality of time slots, and a second antenna direction to be used in a second time slot among the plurality of time slots;

transmit first data from the communication apparatus to another communication apparatus in the first time slot by using a first communication path using the first antenna direction; and retransmit the first data from the communication apparatus to the another communication apparatus in the second time slot by using a second communication path using the second antenna direction if transmission of the first data has failed, and transmit second data different from the first data from the communication apparatus to the another communication apparatus in the second time slot by using the second communication path using the second antenna direction if transmission of the first data has succeeded.

2. The apparatus according to claim 1, wherein the instructions, when executed by the one or more processors, further cause the communication apparatus to determine whether transmission of the first data has succeeded or failed, based on whether an acknowledgement corresponding to the first data is received.

3. The apparatus according to claim 1, wherein for a time slot which has not succeeded in data transmission over a predetermined period among the plurality of time slots, an antenna direction to be used in the time slot is reset.

4. The apparatus according to claim 1, wherein for a time slot which has not succeeded in data reception among the plurality of time slots in a partner apparatus, an antenna direction to be used in the time slot is reset.

5. The apparatus according to claim 1, wherein if transmission of the first data has succeeded, the second data is transmitted in a third time slot among the plurality of time slots by using a third communication path using a third antenna direction.

6. The apparatus according to claim 1, wherein a time slot among the plurality of time slots, for which no antenna direction to be used is set, is used as a time slot during which an antenna direction is searched for.

7. The apparatus according to claim 1, wherein the setting is performed by acquiring, from another apparatus, information of an antenna direction to be used in each of the plurality of time slots.

8. The apparatus according to claim 1, wherein the instructions, when executed by the one or more processors, further cause the communication apparatus to notify a communication partner apparatus of information of an antenna direction to be used in each of the plurality of time slots, which is set.

9. The apparatus according to claim 1, wherein the first data is real-time data, and the second data is non-real-time data.

10. The apparatus according to claim 1, further comprising an image capturer,
wherein the first data is video data obtained by the image capturer, and the second data is control data.

11. A control method for a communication apparatus, the control method comprising:
setting a first antenna direction to be used in a first time slot among a plurality of time slots, and a second antenna direction to be used in a second time slot among the plurality of time slots;

transmitting first data from the communication apparatus to another communication apparatus in the first time slot by using a first communication path using the first antenna direction; and retransmitting the first data from the communication apparatus to the another communication apparatus in the second time slot by using a second communication path using the second antenna direction if transmission of the first data in the first time slot has failed, and transmitting second data different from the first data from the communication apparatus to the another communication apparatus in the second time slot by using the second communication path using the second antenna direction if transmission of the first data in the first time slot has succeeded.

12. A non-transitory computer-readable storage medium storing a computer program for causing a computer of a communication apparatus to execute:

setting a first antenna direction to be used in a first time slot among a plurality of time slots, and a second antenna direction to be used in a second time slot among the plurality of time slots;

transmitting first data from the communication apparatus to another communication apparatus in the first time slot by using a first communication path using the first antenna direction; and retransmitting the first data from the communication apparatus to the another communication apparatus in the second time slot by using a second communication path using the second antenna direction if transmission of the first data in the first time slot has failed, and transmitting second data different from the first data from the communication apparatus to the another communication apparatus in the second time slot by using the second communication path using the second antenna direction if transmission of the first data in the first time slot has succeeded.

* * * * *